(12) United States Patent
Hwang et al.

(10) Patent No.: US 9,745,418 B2
(45) Date of Patent: Aug. 29, 2017

(54) COPOLYCARBONATE AND COMPOSITION COMPRISING THE SAME

(71) Applicant: LG CHEM, LTD., Seoul (KR)

(72) Inventors: Young Young Hwang, Daejeon (KR); Hyong Min Bahn, Daejeon (KR); Jung Jun Park, Daejeon (KR); Moo Ho Hong, Daejeon (KR); Ki Jae Lee, Daejeon (KR); Byoung Kyu Chun, Daejeon (KR); Un Ko, Daejeon (KR); Young Wook Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/911,625

(22) PCT Filed: Sep. 4, 2015

(86) PCT No.: PCT/KR2015/009370
§ 371 (c)(1),
(2) Date: Feb. 11, 2016

(87) PCT Pub. No.: WO2016/036203
PCT Pub. Date: Mar. 10, 2016

(65) Prior Publication Data
US 2016/0251481 A1    Sep. 1, 2016

(30) Foreign Application Priority Data

Sep. 5, 2014 (KR) .................. 10-2014-0118991
Jul. 31, 2015 (KR) .................. 10-2015-0109123
Sep. 3, 2015 (KR) .................. 10-2015-0125112

(51) Int. Cl.
| | |
|---|---|
| *C08L 69/00* | (2006.01) |
| *C08G 64/18* | (2006.01) |
| *C08G 64/22* | (2006.01) |
| *C08G 77/14* | (2006.01) |
| *C08L 83/06* | (2006.01) |
| *C08G 64/30* | (2006.01) |
| *C08G 77/448* | (2006.01) |

(52) U.S. Cl.
CPC ........... *C08G 64/186* (2013.01); *C08G 64/22* (2013.01); *C08G 64/307* (2013.01); *C08G 77/14* (2013.01); *C08L 69/00* (2013.01); *C08L 83/06* (2013.01); *C08G 77/448* (2013.01); *C08L 2205/02* (2013.01)

(58) Field of Classification Search
CPC ........................ C08G 64/186; C08G 77/448
USPC ...................... 525/464; 528/25, 29
See application file for complete search history.

(56) References Cited

U.S. PATENT DOCUMENTS

| | | | |
|---|---|---|---|
| 3,819,744 A | 6/1974 | Buechner et al. | |
| 5,137,949 A | 8/1992 | Paul et al. | |
| 5,324,454 A | 6/1994 | Takata et al. | |
| 5,380,795 A | 1/1995 | Gosens et al. | |
| 5,455,310 A | 10/1995 | Hoover et al. | |
| 5,502,134 A | 3/1996 | Okamoto et al. | |
| 5,608,026 A | 3/1997 | Hoover et al. | |
| 5,783,651 A | 7/1998 | König et al. | |
| 5,932,677 A | 8/1999 | Hoover et al. | |
| 6,001,929 A | 12/1999 | Nodera et al. | |
| 6,252,013 B1 | 6/2001 | Banach et al. | |
| 6,281,286 B1 | 8/2001 | Chorvath et al. | |
| 6,780,956 B2 | 8/2004 | Davis | |
| 7,135,538 B2 | 11/2006 | Glasgow et al. | |
| 7,332,559 B2 | 2/2008 | Hong et al. | |
| 7,432,327 B2 | 10/2008 | Glasgow | |
| 7,498,401 B2 | 3/2009 | Agarwal | |
| 7,524,919 B2 | 4/2009 | Hoover et al. | |
| 7,691,304 B2 | 4/2010 | Agarwal et al. | |
| 7,709,581 B2 | 5/2010 | Glasgow et al. | |
| 7,718,733 B2 | 5/2010 | Juikar et al. | |
| 8,030,379 B2 | 10/2011 | Nodera et al. | |
| 8,084,134 B2 | 12/2011 | Malinoski et al. | |
| 8,124,683 B2 | 2/2012 | Jung et al. | |
| 8,389,648 B2 | 3/2013 | Adoni et al. | |
| 8,466,249 B2 | 6/2013 | Gallucci et al. | |
| 8,552,096 B2 | 10/2013 | Li et al. | |
| 8,912,290 B2 | 12/2014 | Huggins et al. | |
| 8,933,186 B2 | 1/2015 | Bahn et al. | |
| 8,962,780 B2 | 2/2015 | Higaki et al. | |
| 8,981,017 B2 | 3/2015 | Ishikawa | |
| 9,062,164 B2 | 6/2015 | Kim et al. | |
| 9,080,021 B2 | 7/2015 | Ishikawa et al. | |
| 9,102,832 B2 | 8/2015 | Sybert et al. | |
| 9,255,179 B2 | 2/2016 | Park et al. | |
| 2003/0027905 A1 | 2/2003 | Mahood et al. | |
| 2003/0065122 A1 | 4/2003 | Davis | |
| 2004/0200303 A1 | 10/2004 | Inoue et al. | |

(Continued)

FOREIGN PATENT DOCUMENTS

| | | |
|---|---|---|
| CN | 101124282 A | 2/2008 |
| CN | 101585961 A | 11/2009 |

(Continued)

OTHER PUBLICATIONS

Chemical Abstract of US2016/0251481 Mar. 2016.*
Chemical Abstract registry No. 163617-00-3; no date.*

*Primary Examiner* — David Buttner

(74) *Attorney, Agent, or Firm* — Dentons US LLP

(57) ABSTRACT

The present invention relates to copolycarbonates and a composition comprising the same. The copolycarbonate according to the present invention has a structure in which specific siloxane compounds are introduced in the main chain of polycarbonate and thus exhibits the effects of improving impact strength at room temperature, impact strength at low-temperature and melt index.

12 Claims, No Drawings

(56) References Cited

U.S. PATENT DOCUMENTS

| | | | |
|---|---|---|---|
| 2006/0148986 | A1 | 7/2006 | Glasgow et al. |
| 2007/0093629 | A1 | 4/2007 | Silva et al. |
| 2007/0135569 | A1 | 6/2007 | DeRudder |
| 2007/0241312 | A1 | 10/2007 | Hikosaka |
| 2007/0258412 | A1 | 11/2007 | Schilling et al. |
| 2008/0015289 | A1 | 1/2008 | Siripurapu |
| 2008/0081895 | A1 | 4/2008 | Lens et al. |
| 2008/0230751 | A1 | 9/2008 | Li et al. |
| 2009/0087761 | A1 | 4/2009 | Fukushima et al. |
| 2009/0326183 | A1 | 12/2009 | Schultz et al. |
| 2010/0233603 | A1 | 9/2010 | Hikosaka |
| 2012/0123034 | A1 | 5/2012 | Morizur et al. |
| 2012/0251750 | A1 | 10/2012 | Sybert et al. |
| 2012/0252985 | A1 | 10/2012 | Rosenquist et al. |
| 2012/0271009 | A1* | 10/2012 | Higaki .......... C08G 64/186 525/464 |
| 2012/0283393 | A1 | 11/2012 | Ishikawa |
| 2013/0035441 | A1 | 2/2013 | De Brouwer et al. |
| 2013/0082222 | A1 | 4/2013 | Aoki |
| 2013/0186799 | A1 | 7/2013 | Stam et al. |
| 2013/0190425 | A1 | 7/2013 | Zhu et al. |
| 2013/0267665 | A1 | 10/2013 | Huggins et al. |
| 2013/0274392 | A1 | 10/2013 | Morizur et al. |
| 2013/0289224 | A1 | 10/2013 | Bae et al. |
| 2013/0309474 | A1 | 11/2013 | Peek et al. |
| 2013/0313493 | A1 | 11/2013 | Wen et al. |
| 2013/0317142 | A1 | 11/2013 | Chen et al. |
| 2013/0317146 | A1 | 11/2013 | Li et al. |
| 2013/0317150 | A1 | 11/2013 | Wan et al. |
| 2013/0331492 | A1 | 12/2013 | Sharma |
| 2014/0106208 | A1 | 4/2014 | Ishikawa et al. |
| 2014/0148559 | A1 | 5/2014 | Kim et al. |
| 2014/0179843 | A1 | 6/2014 | Van Der Mee et al. |
| 2014/0323623 | A1 | 10/2014 | Miyake et al. |
| 2015/0057423 | A1 | 2/2015 | Kim et al. |
| 2015/0175802 | A1 | 6/2015 | Sybert et al. |
| 2015/0197633 | A1 | 7/2015 | van der Mee et al. |
| 2015/0210854 | A1 | 7/2015 | Aoki |
| 2015/0218371 | A1 | 8/2015 | Lee et al. |
| 2015/0307706 | A1 | 10/2015 | Rosenquist et al. |
| 2015/0315380 | A1 | 11/2015 | Bahn et al. |
| 2015/0344623 | A1 | 12/2015 | Park et al. |
| 2015/0368484 | A1 | 12/2015 | Shishaku et al. |
| 2016/0002410 | A1 | 1/2016 | Iyer et al. |
| 2016/0017102 | A1* | 1/2016 | Yamada .......... C08G 64/186 528/29 |
| 2016/0122477 | A1 | 5/2016 | Rhee et al. |
| 2016/0251481 | A1* | 9/2016 | Hwang .......... C08G 64/186 |
| 2016/0297926 | A1 | 10/2016 | Hwang et al. |
| 2016/0326312 | A1 | 11/2016 | Park et al. |
| 2016/0326313 | A1 | 11/2016 | Son et al. |
| 2016/0326314 | A1 | 11/2016 | Son et al. |
| 2016/0326321 | A1 | 11/2016 | Park et al. |
| 2016/0369047 | A1 | 12/2016 | Hwang et al. |
| 2016/0369048 | A1 | 12/2016 | Park et al. |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 2015163722 * | 9/2015 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 1020080083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |

(56) References Cited

FOREIGN PATENT DOCUMENTS

| | | |
|---|---|---|
| KR | 10-1522321 B1 | 5/2015 |
| KR | 2015-0057275 A | 5/2015 |
| KR | 10-2015-0119823 A | 10/2015 |
| KR | 10-1563269 B1 | 10/2015 |
| KR | 2015-0134457 A | 12/2015 |
| TW | 201241043 A | 10/2012 |
| WO | 2012060516 A1 | 5/2012 |
| WO | 2013/051557 A1 | 4/2013 |
| WO | 2013-058214 A1 | 4/2013 |
| WO | 2013/073709 A1 | 5/2013 |
| WO | 2013/100606 A1 | 7/2013 |
| WO | 2013-115538 A1 | 8/2013 |
| WO | 2013/175445 A2 | 11/2013 |
| WO | 2013/175455 A1 | 11/2013 |
| WO | 2014042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014/144673 A1 | 9/2014 |
| WO | 2015/011669 A2 | 1/2015 |
| WO | 2015/015445 A2 | 2/2015 |
| WO | WO-2015/087595 * | 6/2015 |

\* cited by examiner

COPOLYCARBONATE AND COMPOSITION COMPRISING THE SAME

CROSS-REFERENCE TO RELATED APPLICATION(S)

This application is a National Stage Application of International Application No. PCT/KR2015/009370, filed Sep. 4, 2015, and claims the benefit of Korean Patent Application No. 10-2014-0118991 on Sep. 5, 2014, Korean Patent Application No. 10-2015-0109123 on Jul. 31, 2015, and Korean Patent Application No. 10-2015-0125112 on Sep. 3, 2015, the contents of which are incorporated by reference in their entirety for all purposes as if fully set forth below.

TECHNICAL FIELD

The present invention relates to copolycarbonates and a composition comprising the same, and more specifically to copolycarbonates which are capable of being economically produced and having improved impact strength at room temperature, impact strength at low-temperature and melt index, and to a composition comprising the same.

BACKGROUND ART

Polycarbonate resins are prepared by condensation-polymerization of an aromatic diol such as bisphenol A with a carbonate precursor such as a phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more varied fields, many studies have been made to obtain desired physical properties by copolymerizing two or more aromatic diol compounds having different structures from each other and introducing units having different structures in the main chain of the polycarbonate.

Especially, studies for introducing a polysiloxane structure in a main chain of the polycarbonate have been undergone, but most of these technologies have disadvantages in that production costs are high and a chemical resistance or impact strength, particularly impact strength at low-temperature are increased, but melt index is conversely reduced.

Given the above circumstances, the present inventors have conducted extensive studies to overcome the drawbacks encountered in the prior arts and develop a copolycarbonate with improved physical properties such as impact strength at room temperature, impact strength at low-temperature and melt index, and found that a copolycarbonate in which specific siloxane compounds are introduced in the main chain of the polycarbonate as described below satisfies the above-described properties. The present invention has been completed on the basis of such as finding.

DISCLOSURE OF INVENTION

Technical Problem

It is an object of the present invention to provide a copolycarbonate with improved physical properties such impact strength at room temperature, impact strength at low-temperature and melt index.

It is another object of the present invention to provide a polycarbonate composition comprising the above copolycarbonate and a polycarbonate.

It is a further object of the present invention an article comprising the above copolycarbonate or the polycarbonate composition.

Technical Solution to Problem

In order to achieve these objects, the present invention provides a copolycarbonate having a weight average molecular weight of 1,000 to 100,000 g/mol, which comprises:
a repeating unit represented by the following Formula 1,
a repeating unit represented by the following Formula 2, and
a repeating unit represented by the following Formula 3:

[Formula 1]

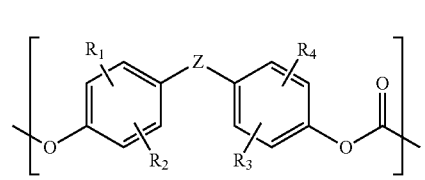

in the above Formula 1,
each of $R_1$, $R_2$, $R_3$ and $R_4$ is independently hydrogen, $C_{1-10}$ alkyl, or halogen, and
Z is $C_{1-10}$ alkylene unsubstituted or substituted by phenyl, $C_{3-10}$ cycloalkylene, O, S, SO, $SO_2$, or CO,

[Formula 2]

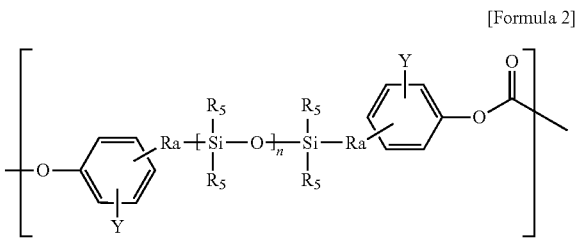

in the above Formula 2,
each of Ra is independently $C_{1-10}$ alkylene,
each of Y is independently $C_{1-10}$ alkoxy,
each of $R_5$ is independently hydrogen or $C_{1-13}$ alkyl, and
n is an integer of 1 to 40,

[Formula 3]

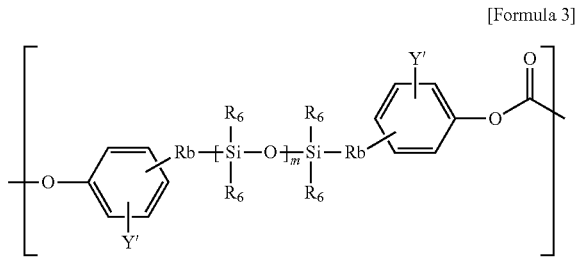

in the above Formula 3,
each of Rb is independently $C_{1-10}$ alkylene,
each of Y' is independently $C_{1-10}$ alkoxy,
each of $R_6$ is independently hydrogen, or $C_{1-13}$ alkyl, and
m is an integer of 41 to 150.

The copolycarbonate according to the present invention includes a polycarbonate structure which is formed of a repeating unit represented by the Formula 1. Generally, a polycarbonate has excellent overall mechanical physical properties, but is inferior in terms of impact strength at room temperature, impact strength at low-temperature and melt index. Therefore, in order to improve these properties, there is a need to introduce another structure other than the polycarbonate structure.

In this regard, the copolycarbonate according to the present invention has a structure in which the polysiloxane formed of a repeating unit represented by the Formula 2 and a repeating unit represented by the Formula 3, in addition to the repeating unit represented by the Formula 1, are copolymerized in the polycarbonate, through which impact strength at room temperature, impact strength at low-temperature and melt index are greatly improved as compared with a conventional polycarbonate.

In particular, in the case of the repeating unit represented by the Formula 2 and the repeating unit represented by the Formula 3, the repeating unit numbers (n and m) of the silicon oxide within each of the Formulas are different from each other. According to Examples and Comparative Examples which are described later, compared to the case of containing only any one of the repeating unit represented by the Formula 2 and the repeating unit represented by the Formula 3, the case of containing both of them can significantly increase the level of improvement in impact strength at room temperature, low temperature impact strength and melt index. This is because the mutual complementary action by the respective repeating units results in a high level of improvement in the physical properties.

Now, the present invention will be described in more detail.

Repeating Unit Represented by the Formula 1

The repeating unit represented by the Formula 1 is formed by the reaction of an aromatic diol compound and a carbonate precursor.

In the Formula 1, preferably, each of $R_1$, $R_2$, $R_3$ and $R_4$ is independently hydrogen, methyl, chloro, or bromo. Also, preferably, Z is a linear or branched $C_{1-10}$ alkylene which is unsubstituted or substituted by phenyl. More preferably, Z is methylene, ethane-1,1-diyl, propane-2,2-diyl, butane-2,2-diyl, 1-phenylethane-1,1-diyl, or diphenylmethylene. Further, Z is preferably cyclohexane-1,1-diyl, O, S, SO, $SO_2$, or CO.

Preferably, the repeating unit represented by the Formula 1 may be derived from one or more aromatic diol compounds selected from the group consisting of bis(4-hydroxyphenyl) methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl) propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethyl)propane, 1,1-bis(4-hydroxyphenyl)-1-phenylethane, bis(4-hydroxyphenyl) diphenylmethane, and α,ω-bis[3-(o-hydroxyphenyl)propyl]polydimethylsiloxane.

The above "derived from aromatic diol compounds" means that a hydroxy group of the diol compound and a carbonate precursor are reacted to form the repeating unit represented by the Formula 1.

For example, if bisphenol A, i.e., an aromatic diol compound, and triphosgene, i.e., a carbonate precursor are polymerized, the repeating unit represented by the Formula 1 is represented by the following Formula 1-1:

[Formula 1-1]

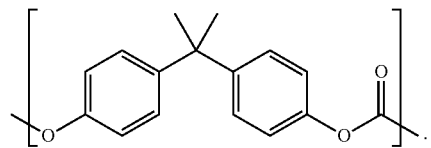

The above-described carbonate precursor may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene and bishaloformate. Preferably, triphosgene or phosgens may be used.

Repeating Unit Represented by the Formula 2 and Repeating Unit Represented by the Formula 3

The repeating unit represented by the Formula 2 and the repeating unit represented by the Formula 3 are formed by the reaction of the siloxane compound and the carbonate precursor, respectively.

In the above Formula 2, preferably each of Ra is independently $C_{2-10}$ alkylene, more preferably $C_{2-4}$ alkylene, and most preferably propane-1,3-diyl. In addition, Y is preferably $C_{1-4}$ alkoxy, and more preferably methoxy. In addition, each of $R_5$ is independently preferably $C_{1-6}$ alkyl, more preferably $C_{1-3}$ alkyl and most preferably methyl.

In the above Formula 3, each of Rb is independently preferably $C_{2-10}$ alkylene, more preferably $C_{2-4}$ alkylene and most preferably propane-1,3-diyl. In addition, Y' is preferably $C_{1-4}$ alkoxy, and more preferably methoxy. In addition, each of $R_6$ is independently preferably $C_{1-6}$ alkyl, more preferably $C_{1-3}$ alkyl and most preferably methyl.

Further, preferably, Ra and Rb are the same as each other. Further, preferably, Y and Y' are the same as each other. Further, preferably, $R_5$ and $R_6$ are the same as each other.

Further, preferably, the above Formula 2 is represented by the following Formula 2-1:

[Formula 2-1]

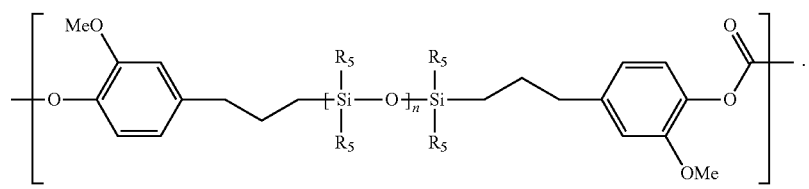

Further, preferably, the above Formula 3 is represented by the following Formula 3-1:

[Formula 3-1]

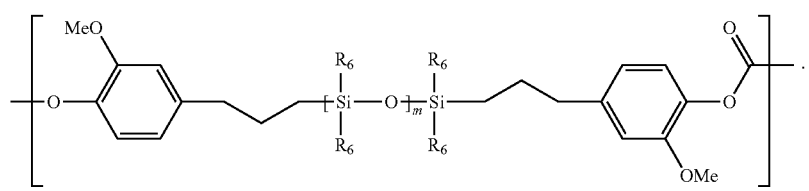

Further, preferably, in the above Formula 1, n is an integer of more than 10, more than 15, more than 20, more than 25, and is not more than 35. In addition, preferably, in the above Formula 2, m is an integer of more than 45, more than 50, or more than 55, and is not more than 100, not more than 95, not more than 90, not more than 85, not more than 80, not more than 75, not more than 70, or not more than 65.

Preferably, the repeating unit represented by the Formula 2 and the repeating unit represented by the Formula 3 are derived from a siloxane compound represented by the following Formula 2-2 and a siloxane compound represented by the following Formula 3-2, respectively.

[Formula 2-2]

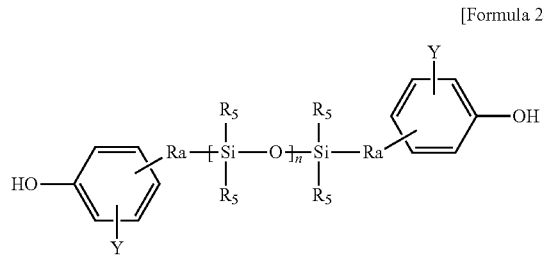

in the above Formula 2-2,
Ra, Y, $R_5$ and n are as previously defined,

[Formula 3-2]

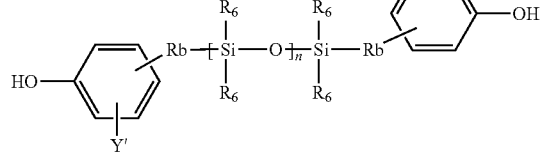

in the above Formula 3-2,
Rb, Y', $R_6$ and m are as previously defined.

The above "derived from a siloxane compound" means that a hydroxy group of the respective siloxane compound and a carbonate precursor are reacted to form the repeating unit represented by the Formula 2 and the repeating unit represented by the Formula 3, respectively. Further, the carbonate precursors that can be used for the formation of the repeating units represented by the Formulae 2 and 3 are the same as those described in the carbonate precursor that can be used for the formation of the repeating unit represented by the Formula 1 described above.

The methods for preparing the siloxane compound represented by the Formula 2-2 and the siloxane compound represented by the Formula 3-2 are represented by the following reaction schemes 1 and 2, respectively:

[Reaction Scheme 1]

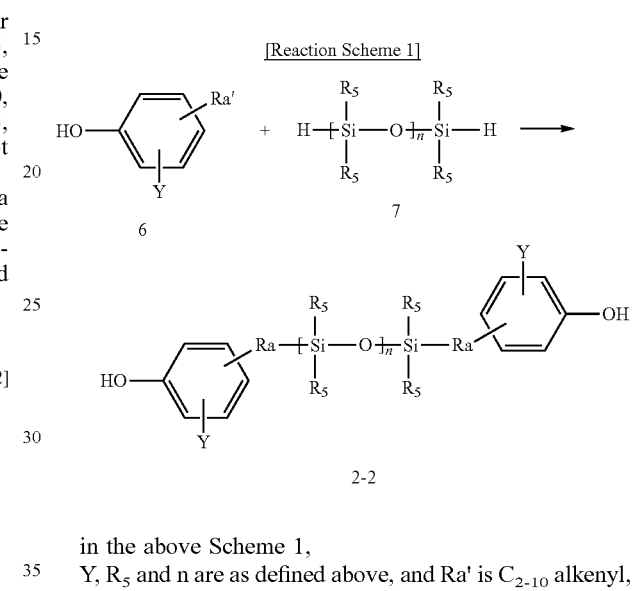

in the above Scheme 1,
Y, $R_5$ and n are as defined above, and Ra' is $C_{2-10}$ alkenyl,

[Reaction Scheme 2]

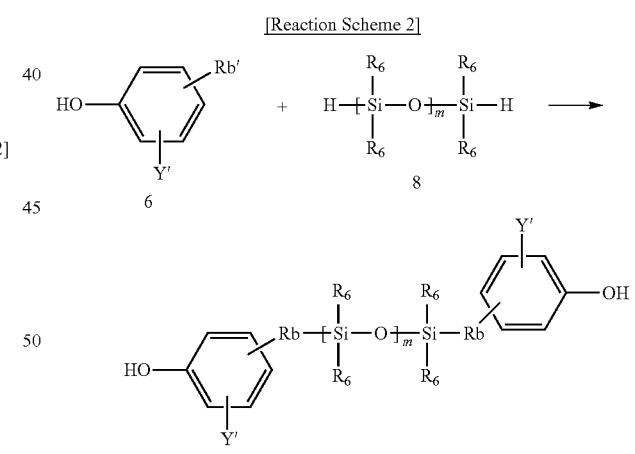

in the above Scheme 2,
Y', $R_6$ and m are as previously defined, and Rb' is $C_{2-10}$ alkenyl, The reaction of the Scheme 1 and Scheme 2 is preferably conducted in the presence of a metal catalyst. As the metal catalyst, a Pt catalyst is preferably used. The Pt catalyst may include one or more selected from the group consisting of Ashby catalyst, Karstedt catalyst, Lamoreaux catalyst, Speier catalyst, $PtCl_2(COD)$, $PtCl_2(benzonitrile)_2$ and $H_2PtBr_6$. The metal catalyst may be used in an amount of more than 0.001 parts by weight, more than 0.005 parts by weight, or more than 0.01 parts by weight, and not more than 1 part by weight, not more than 0.1 part by weight, or not more than 0.05 part by weight, based on 100 parts by weight of the compounds represented by the Formulae 7 or 8.

Further, the reaction temperature is preferably 80 to 100° C. Further, the reaction time is preferably 1 to 5 hours.

In addition, the compounds represented by the Formulae 7 or 8 can be prepared by reacting an organodisiloxane and an organocyclosiloxane in the presence of an acid catalyst, and n and m may be adjusted by adjusting the amount of the reactants used. The reaction temperature is preferably 50 to 70° C. Also, the reaction time is preferably 1 to 6 hours.

The above organodisiloxane may include one or more selected from the group consisting of tetramethyldisiloxane, tetraphenyl disiloxane, hexamethyldisiloxane and hexaphenyl disiloxane. In addition, the above organocyclosiloxane may include, for example, organocyclotetrasiloxane, examples of which may include octamethylcyclotetrasiloxane and octaphenylcyclotetrasiloxane and the like.

The above organodisiloxane can be used in an amount of more than 0.1 parts by weight or more than 2 parts by weight, and not more than 10 parts by weight or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of more than 0.1 parts by weight, more than 0.5 parts by weight or more than 1 part by weight, and not more than 10 parts by weight, not more than 5 parts by weight or not more than 3 parts by weight, based on 100 parts by weight of the organocyclosiloxane.

In particular, by adjusting the content of the repeating unit represented by the Formula 2 and the repeating unit represented by the Formula 3, the impact strength at low-temperature and melt index of the copolycarbonate can be improved at the same time. Preferably, the weight ratio of the repeating unit represented by the Formula 2 and the repeating unit represented by the Formula 3 is from 99:1 to 1:99 and more preferably from 80:20 to 20:80. The weight ratio of the above repeating units corresponds to the weight ratio of siloxane compounds, for example the siloxane compound represented by the Formula 2-2 and the siloxane compound represented by the Formula 3-2.

Copolycarbonate

The copolycarbonate according to the present invention comprises the repeating units represented by the Formulae 1 to 3, and is preferably a random copolymer.

Also, preferably, the copolycarbonate according to the present invention has a weight average molecular weight (g/mol) of 15,000 to 35,000. More preferably, the above weight average molecular weight is more than 20,000, more than 21,000, more than 22,000, more than 23,000, more than 24,000, 25,000, more than 26,000, more than 27,000, or 28,000. Also, the above weight average molecular weight is not more than 34,000, not more than 33,000, not more than 32,000, nor more than 31,000 or not more than 30,000.

Further, the weight ratio of the weight of the repeating unit represented by the Formula 1 and the total weight of the repeating unit represented by the Formula 2 and the repeating unit represented by the Formula 3 (i.e., Formula 1:(Formula 2+Formula 3)) is preferably 1:0.04 to 0.07.

The copolycarbonate according to the present invention can be prepared by the method comprising a step of polymerizing a composition including the above-described aromatic diol compound, the compound represented by the Formula 2-2, the compound represented by the Formula 3-2 and the carbonate precursor.

During the polymerization, the total weight of the compound represented by the Formula 2-2 and the compound represented by the Formula 3-2 in the above composition is more than 0.1% by weight, more than 0.5% by weight, more than 1% by weight, or more than 1.5% by weight, and preferably is not more than 20% by weight, not more than 10% by weight, not more than 7% by weight, not more than 5% by weight, or not more than 4% by weight, based on 100% by weight of the composition.

Also, the above aromatic diol compound can be used in an amount of more than 40% by weight, more than 50% by weight, or more than 55% by weight, and not more than 80% by weight, not more than 70% by weight, or not more than 65 by weight, based on 100% by weight of the composition.

Moreover, the above carbonate precursor can be used in an amount of more than 10% by weight, more than 20% by weight, or more than 30% by weight, and not more than 60% by weight, not more than 50% by weight, or not more than 40 by weight, based on 100% by weight of the composition.

Further, as the polymerization method, an interfacial polymerization method can be used as an example. In this case, there are advantages in that the polymerization reaction can be conducted at low temperature under normal pressure, and it is easy to adjust the molecular weight. The interfacial polymerization is preferably conducted in the presence of an acid binder and an organic solvent. Furthermore, the interfacial polymerization may include, for example, a step of introducing a coupling agent after pre-polymerization and then again conducting the polymerization. In this case, the copolycarbonate having a high molecular weight can be obtained.

The materials used in the interfacial polymerization are not particularly limited as long as they are materials that can be used in the polymerization of polycarbonates. The used amount thereof may be adjusted as needed.

As the acid binding agent, alkali metal hydroxides such as sodium hydroxide or potassium hydroxide, or amine compounds such as pyridine can be used.

The organic solvents are not particularly limited as long as they are solvents that can be usually used in the polymerization of polycarbonates. For example, halogenated hydrocarbons such as methylene chloride or chlorobenzene can be used.

Further, during the interfacial polymerization, the tertiary amine compounds such as triethylamine, tetra-n-butyl ammonium bromide, tetra-n-butylphosphonium bromide or reaction accelerators such as a quaternary amine compound or a quaternary phosphonium compound can be further used in order to accelerate the reaction.

The reaction temperature for the interfacial polymerization is preferably from 0 to 40° C. and the reaction time is preferably from 10 minutes to 5 hours. Further, during the interfacial polymerization reaction, pH is desirably maintained at more than 9, or more than 11.

In addition, the interfacial polymerization may be conducted by further comprising a molecular weight modifier. The molecular weight modifier may be added before the initiation of polymerization, during the initiation of polymerization, or after the initiation of polymerization.

As the above molecular weight modifier, mono-alkylphenol may be used. As an example, the mono-alkyl phenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight control is great.

The above molecular weight modifier is contained in an amount of more than 0.01 parts by weight, more than 0.1 parts by weight or more than 1 part by weight, and not more than 10 parts by weight, not more than 6 parts by weight, or not more than 5 parts by weight, based on 100 parts by weight of the aromatic diol compound. Within this range, the required molecular weight can be obtained.

Polycarbonate Composition

In addition, the present invention provides a polycarbonate composition comprising the copolycarbonates and the polycarbonate. The copolycarbonate may be used alone, but it can be used together with the polycarbonate as needed to thereby control the physical properties of the copolycarbonate.

Preferably, the above polycarbonate comprises the repeating unit represented by the following Formula 4:

[Formula 4]

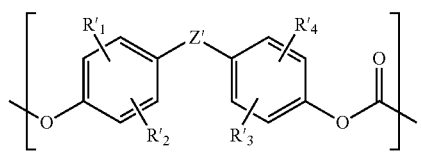

in the above Formula 4, each of $R'_1$, $R'_2$, $R'_3$ and $R'_4$ is independently hydrogen, $C_{1-10}$ alkyl, or halogen, $Z'$ is $C_{1-10}$ alkylene unsubstituted or substituted by phenyl, $C_{3-10}$ cycloalkylene, O, S, SO, $SO_2$, or CO.

The repeating unit represented by the Formula 4 is formed by the reaction of the aromatic diol compound and the carbonate precursor. The aromatic diol compound and the carbonate precursor that can be used herein are the same as those as previously described in the repeating unit represented by the Formula 1.

Preferably, each of $R'_1$, $R'_2$, $R'_3$, $R'_4$ and $Z'$ in the Formula 4 are the same as $R_1$, $R_2$, $R_3$, $R_4$ and $Z$ in the Formula 1 described above, respectively.

Further, preferably, the repeating unit represented by the Formula 4 is represented by the following Formula 4-1:

[Formula 4-1]

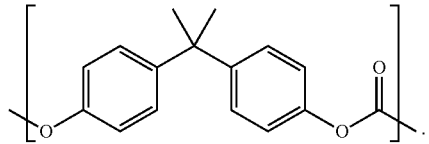

In the polycarbonate composition, the weight ratio of the copolycarbonate and the polycarbonate is preferably from 99:1 to 1:99, more preferably from 90:10 to 50:50, and most preferably from 80:20 to 60:40.

In addition, the present invention provides an article comprising the copolycarbonate or the polycarbonate composition.

Preferably, the above article is an injection molded article. In addition, the article may further include, for example, one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

The method for preparing the article may include the steps of mixing the copolycarbonate according to the present invention and additives such as antioxidants using a mixer, extrusion-molding the mixture with an extruder to produce pellets, drying the pellets and then injecting them with the injection molding machine.

Advantageous Effects of the Invention

As set forth above, according to the present invention, the copolycarbonate in which specific siloxane compounds are introduced in the main chain of the polycarbonate exhibits the effects of improving impact strength at room temperature, impact strength at low-temperature and melt index.

MODE FOR THE INVENTION

Below, the preferred embodiments are presented to aid in the understanding of the invention. However, these examples are provided only for illustration of the present invention, and should not be construed as limiting the present invention by the examples.

PREPARATION EXAMPLE 1

Production of Polyorganosiloxane (Eu-30)

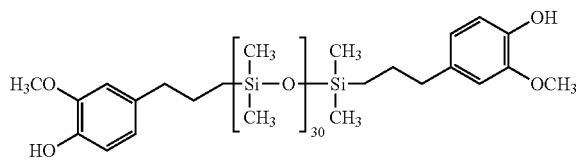

42.5 g (142.8 mmol) of octamethylcyclotetrasiloxane and 2.26 g (16.8 mmol) of tetramethyldisiloxane were mixed. The mixture was then placed in 3 L flask together with 1 part by weight of an acid clay (DC-A3) compared to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the unmodified polyorganosiloxane thus prepared was confirmed through $^1$H NMR and the result was 30.

In the resulting terminal-unmodified polyorganosiloxane, 11.7 g (71.3 mmol) of eugenol and 0.01 g (50 ppm) of Karstedt's platinum catalyst were introduced and reacted at 90° C. for 3 hours. After completion of the reaction, the unreacted polyorganosiloxane was removed by conducting the evaporation under the conditions of 120° C. and 1 torr. The terminal-modified polyorganosiloxane thus prepared was a pale yellow oil and the repeating unit (n) was 30. Further purification was not required. The preparation thereof was confirmed through $^1$H NMR and this was designated as Eu-30.

PREPARATION EXAMPLE 2

Preparation of Polyorganosiloxane (Eu-60)

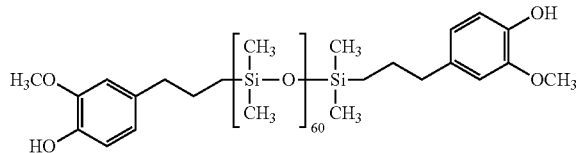

57.5 g (193.2 mmol) of octamethylcyclotetrasiloxane and 2.26 g (16.8 mmol) of tetramethyldisiloxane were mixed. The mixture was then introduced in 3 L flask together with 1 part by weight of an acid clay (DC-A3) compared to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the unmodified polyorganosiloxane thus prepared was confirmed through $^1$H NMR and the result was 60.

In the resulting terminal-unmodified polyorganosiloxane, 8.7 g of eugenol and 0.01 g (50 ppm) of Karstedt's platinum catalyst were introduced and reacted at 90° C. for 3 hours. After completion of the reaction, the unreacted polyorganosiloxane was removed by conducting the evaporation under the conditions of 120° C. and 1 torr. The terminal-modified polyorganosiloxane thus prepared was a pale yellow oil and the repeating unit (m) was 60. Further purification was not required. The preparation thereof was confirmed through $^1$H NMR and this was designated as Eu-60.

PREPARATION EXAMPLE 3

Preparation of Polycarbonate 978.4 g of Bisphenol A (BPA), 1,620 g of NaOH 32% aqueous solution, and 7,500 g of distilled water were introduced in 20 L glass reactor. After confirming that BPA was completely dissolved in a nitrogen atmosphere, 3,670 g of methylene chloride and 18.3 g of p-tert-butylphenol were introduced and mixed. To this mixture, 3,850 g of methylene chloride in which 542.5 g of triphosgene was dissolved was added dropwise for one hour. At this time, a NaOH aqueous solution was maintained at pH 12. After completion of the dropwise addition, the reaction product was aged for 15 minutes, and 195.7 g of triethylamine was dissolved in methylene chloride and introduced. After 10 minutes, pH was adjusted to 3 with a 1 N aqueous hydrochloric acid solution and then washed three times with distilled water. Subsequently, the methylene chloride phase was separated, and then precipitated in methanol to give a polycarbonate resin in the form of a powder. The molecular weight was measured with GPC using PC Standard and the result confirmed that the weight average molecular weight was 27,500 g/mol.

EXAMPLE 1

Step 1: Preparation of Copolycarbonate 978.4 g of Bisphenol A (BPA), 1,620 g of NaOH 32% aqueous solution, and 7,500 g of distilled water were introduced in 20 L glass reactor. After confirming that BPA was completely dissolved in a nitrogen atmosphere, 3,670 g of methylene chloride, 18.3 g of p-tert-butylphenol, and 55.2 g of polyorganosiloxane previously prepared (mixture of 80% by weight of polyorganosiloxane (Eu-30) of Preparation Example 1 and 20% by weight of polyorganosiloxane (Eu-60) of Preparation Example 2) were introduced and mixed. To this mixture, 3,850 g of methylene chloride in which 542.5 g of triphosgene was dissolved was added dropwise for one hour. At this time, a NaOH aqueous solution was maintained at pH 12. After completion of the dropwise addition, the reaction product was aged for 15 minutes, and 195.7 g of triethylamine was dissolved in methylene chloride and introduced. After 10 minutes, pH was adjusted to 3 with 1 N aqueous hydrochloric acid solution and then washed three times with distilled water. Subsequently, the methylene chloride phase was separated, and then precipitated in methanol to give a copolycarbonate resin in the form of a powder. The molecular weight of the resulting copolycarbonate was measured with GPC using PC Standard and the result confirmed that the weight average molecular weight was 29,600 g/mol.

Step 2: Preparation of Injection Specimen

To the copolycarbonate prepared in the step 1, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritoltetrastearate were added, and the resulting mixture was pelletized using a vented φ30 mm twin screw extruder. Thereafter, a specimen was injection-molded using a cylinder temperature of 300° C. and a mold temperature of 80° C. using the N-20C injection molding machine of JSW Co., Ltd.

EXAMPLE 2

The copolycarbonate and its molded specimen were prepared in the same method as in Example 1, except that 55.2 g of polyorganosiloxane (mixture of 20% by weight of polyorganosiloxane (Eu-30) of Preparation Example 1 and 80% by weight of polyorganosiloxane (Eu-60) of Preparation Example 2) was used.

EXAMPLE 3

The polycarbonate composition and its specimen were prepared using 80% by weight of copolycarbonate prepared in step 1 of Example 1 and 20% by weight of polycarbonate of Preparation Example 3, instead of the copolycarbonate prepared in step 2 of Example 1.

COMPARATIVE EXAMPLE 1

The copolycarbonate and its molded specimen were prepared by the same method as in Example 1, except that 55.2 g of polyorganosiloxane (100% by weight of polyorganosiloxane (Eu-30) of Preparation Example 1) was used.

COMPARATIVE EXAMPLE 2

The copolycarbonate and its molded specimen were prepared by the same method as in Example 1, except that 55.2 g of polyorganosiloxane (100% by weight of polyorganosiloxane (Eu-60) of Preparation Example 2) was used.

COMPARATIVE EXAMPLE 3

The molded specimen of the copolycarbonate was prepared using the polycarbonate of Preparation Example 3, instead of the copolycarbonate prepared in step 2 of Example 1.

EXPERIMENTAL EXAMPLE

Evaluation of Physical Properties

The physical properties of the copolycarbonate specimens prepared in the Examples and the polycarbonate specimens prepared in the Comparative Examples were measured in the following manner and the results were shown in Table 1 below.

Weight average molecular weight (g/mol): measured by Agilent 1200 series using PC Standard.

Melt index (MI): measured in accordance with ASTM D 1238 (300° C., 1.2 kg conditions).

Impact strength at room temperature, and impact strength at low-temperature (J/m): measured at 23° C. and −30° C. in accordance with ASTM D256 (⅛ inch, Notched Izod).

Repeating unit: measured by $^1$H-NMR using a Varian 500 MHz.

TABLE 1

|  | Impact strength at room temperature (23° C., J/m) | Impact strength at low temperature (−30° C., J/m) | Melt index (MI, g/10 min) | Weight average molecular weight (Mw, g/mol) |
| --- | --- | --- | --- | --- |
| Ex. 1 | 659 | 583 | 12 | 29,600 |
| Ex. 2 | 618 | 501 | 14 | 28,500 |
| Ex. 3 | 621 | 533 | 15 | 29,100 |
| Com. Ex. 1 | 124 | 117 | 33 | 25,100 |
| Com. Ex. 2 | 659 | 636 | 10 | 30,300 |
| Com. Ex. 3 | 660 | 116 | 14 | 27,500 |

The invention claimed is:

1. A copolycarbonate having a weight average molecular weight of 1,000 to 100,000 g/mol, which comprises:
a repeating unit represented by the following Formula 1,
a repeating unit represented by the following Formula 2, and
a repeating unit represented by the following Formula 3:

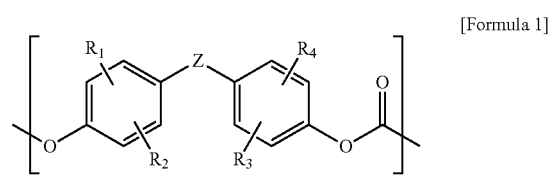

[Formula 1]

in the above Formula 1,
each of $R_1$, $R_2$, $R_3$ and $R_4$ is independently hydrogen, $C_{1-10}$ alkyl, or halogen, and
Z is $C_{1-10}$ alkylene unsubstituted or substituted by phenyl, $C_{3-10}$ cycloalkylene, O, S, SO, $SO_2$, or CO,

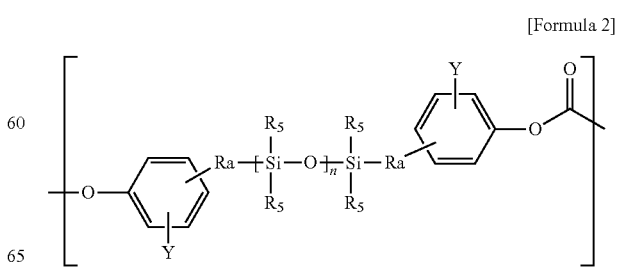

[Formula 2]

in the above Formula 2, each of Ra is independently $C_{1-10}$ alkylene, each of Y is independently $C_{1-10}$ alkoxy, each of $R_5$ is independently hydrogen, or $C_{1-13}$ alkyl, and n is an integer of 10 to 35,

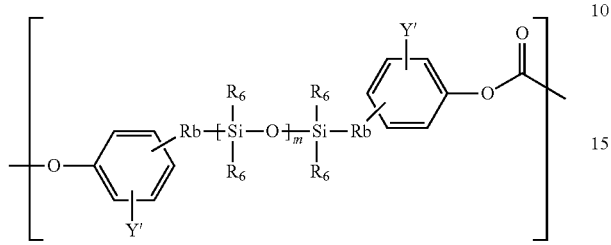

[Formula 3]

in the above Formula 3, each of Rb is independently $C_{1-10}$ alkylene, each of Y' is independently $C_{1-10}$ alkoxy, each of $R_6$ is independently hydrogen, or $C_{1-13}$ alkyl, and m is an integer of 45 to 85, wherein a ratio of the weight of the repeating unit represented by Formula 1 to the total weight of the repeating units represented by Formula 2 and Formula 3 is 1:0.04 to 1:0.07.

2. The copolycarbonate of claim 1 wherein the repeating unit represented by the Formula 1 is derived from one or more aromatic diol compounds selected from the group consisting of bis(4-hydroxyphenyl) methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis (4-hydroxyphenyl)butane, 1,1-bis(4-hydroxyphenyl) cyclohexane, 2,2-bis(4-hydroxyl-3,5-dibromophenyl) propane, 2,2-bis(4-hydroxy-3,5-dichlorophenyl) propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethyl)propane, 1,1-bis(4-hydroxyphenyl)-1-phenylethane, bis(4-hydroxyphenyl)diphenylmethane, and a, ω-bis[3-(o-hydroxyphenyl)propyl]polydimethylsilmane.

3. The copolycarbonate of claim 1 wherein the repeating unit represented by the Formula 1 is represented by the following Formula 1-1:

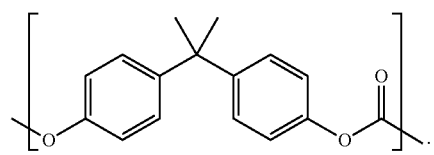

[Formula 1-1]

4. The copolycarbonate of claim 1 wherein each of $R_5$ is independently $C_{1-6}$ alkyl.

5. The copolycarbonate of claim 1 wherein each of $R_6$ is independently $C_{1-6}$ alkyl.

6. The copolycarbonate of claim 1 wherein $R_5$ and $R_6$ are the same as each other.

7. The copolycarbonate of claim 1 wherein the repeating unit represented by the Formula 2 is represented by the following Formula 2-1:

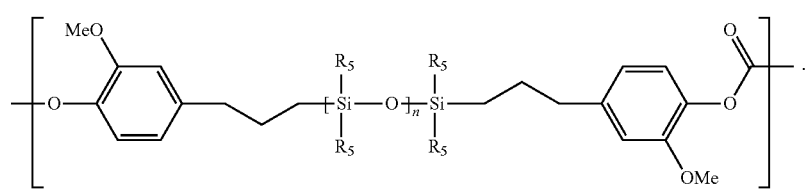

[Formula 2-1]

8. The copolycarbonate of claim 1 wherein the repeating unit represented by the Formula 3 is represented by the following Formula 3-1:

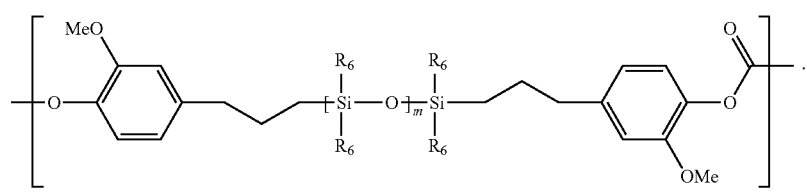

[Formula 3-1]

9. The copolycarbonate of claim 1 wherein the copolycarbonate has a weight average molecular weight of 15,000 to 35,000 g/mol.

10. A polycarbonate composition which comprises the copolycarbonate of claim 1, and a polycarbonate.

11. The polycarbonate composition of claim 10 wherein the polycarbonate comprises the repeating unit represented by the following Formula 4:

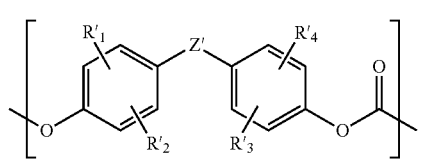
[Formula 4]
in the above Formula 4,
each of $R'_1$, $R'_2$, $R'_3$ and $R'_4$ are independently hydrogen, $C_{1-10}$ alkyl, or halogen, and
$Z'$ is $C_{1-10}$ alkylene unsubstituted or substituted by phenyl, $C_{3-10}$ cycloalkylene, O, S, SO, $SO_2$, or CO.
12. The polycarbonate composition of claim 10 wherein the weight ratio of the copolycarbonate and the polycarbonate is from 99:1 to 1:99.
* * * * *